US009495150B2

(12) United States Patent
Koezuka et al.

(10) Patent No.: US 9,495,150 B2
(45) Date of Patent: Nov. 15, 2016

(54) INFORMATION PROCESSING APPARATUS AND METHOD, AND COMPUTER PROGRAM PRODUCT

(71) Applicant: Kabushiki Kaisha Toshiba, Minato-ku, Tokyo (JP)

(72) Inventors: Mayuko Koezuka, Ota Tokyo (JP); Hidenori Matsuzaki, Fuchu Tokyo (JP); Akira Kuroda, Yokohama Kanagawa (JP); Nobuaki Tojo, Tachikawa Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/638,008

(22) Filed: Mar. 4, 2015

(65) Prior Publication Data
US 2015/0268953 A1 Sep. 24, 2015

(30) Foreign Application Priority Data

Mar. 18, 2014 (JP) .................................. 2014-055360

(51) Int. Cl.
*G06F 9/44* (2006.01)
*G06F 11/36* (2006.01)

(52) U.S. Cl.
CPC . *G06F 8/71* (2013.01); *G06F 8/75* (2013.01); *G06F 11/3604* (2013.01)

(58) Field of Classification Search
CPC ..................................... G06F 8/75; G06F 8/71
USPC .......................................................... 717/121
See application file for complete search history.

(56) References Cited

U.S. PATENT DOCUMENTS

| 6,138,270 A * | 10/2000 | Hsu ........................... G06F 8/71 717/125 |
| 9,286,062 B2 * | 3/2016 | Ishida ....................... G06F 8/75 |
| 2014/0189676 A1 * | 7/2014 | Mahajan ................... G06F 8/43 717/170 |

(Continued)

FOREIGN PATENT DOCUMENTS

| JP | 4560608 B2 | 8/2010 |
| JP | 2012-164211 A | 8/2012 |

OTHER PUBLICATIONS

Toshihiro Kamiya, et al., "CCFinder: A Multilinguistic Token-Based Code Clone Detection System for Large Scale Source Code," IEEE Transactions on Software Engineering, vol. 28, No. 7, Jul. 2002, pp. 654-670.

*Primary Examiner* — John Chavis
(74) *Attorney, Agent, or Firm* — Knobbe, Martens, Olson & Bear, LLP

(57) ABSTRACT

According to an embodiment, an information processing apparatus includes a storage, an accepting unit, an analyzer, a determination unit, and an output controller. The storage stores therein one or more pieces of first feature information respectively representing features of one or more source codes, and one or more pieces of assistance information representing update situations of the source codes, in a corresponding manner. The accepting unit accepts input of second feature information representing a feature of a source code to be analyzed. The analyzer calculates similarity between the first feature information and the second feature information. The determination unit selects, based on the similarity, assistance information to be output, from the pieces of assistance information stored in the storage. The output controller outputs the selected assistance information.

15 Claims, 14 Drawing Sheets

(56) References Cited

U.S. PATENT DOCUMENTS

2014/0229916 A1\* 8/2014 Bates ................. G06F 11/3624
717/124

\* cited by examiner

FIG.8

| word [0] | word [1] | word [2] | test | format | performance | comment | UPDATE RESULT INFORMATION | HISTORY INFORMATION |
|---|---|---|---|---|---|---|---|---|
| refactor | bug | test | 1 | 0 | 1.0 | 1 | READABILITY PROBLEMS (COST 0.1) | #BEFORE REVIEW<br>for (···) {<br>  a = a + 1;<br>  b = b + 10;<br>}<br>--------------------<br>#AFTER REVIEW<br>for (···) {<br>  a +=1;<br>  b +=10;<br>} |

| word [0] | word [1] | word [2] | test | format | performance | comment | UPDATE RESULT INFORMATION | HISTORY INFORMATION |
|---|---|---|---|---|---|---|---|---|
| bug | structure | test | 0 | 1 | 0.8 | 1 | INSUFFICIENT TESTS (COST 1.0) | #BEFORE REVIEW<br>  a = a + 1;<br>  b = b + 10;<br>--------------------<br>#AFTER REVIEW<br>  a +=1;<br>  b +=10; |

| word [0] | word [1] | word [2] | test | format | performance | comment | UPDATE RESULT INFORMATION | HISTORY INFORMATION |
|---|---|---|---|---|---|---|---|---|
| performance | bug | instruction | 1 | 1 | 0.6 | 1 | PERFORMANCE PROBLEMS (COST 0.1) | #BEFORE REVIEW<br>while (a<10) {<br>  a = a + 1;<br>  b = b + 10;<br>}<br>--------------------<br>#AFTER REVIEW<br>for (···) {<br>  a = a + 1;<br>  b = b + 10;<br>} |

| word [0] | word [1] | word [2] | test | format | performance | comment | UPDATE RESULT INFORMATION | HISTORY INFORMATION |
|---|---|---|---|---|---|---|---|---|
| refactor | performance | test | 1 | 1 | 0.5 | 0 | CODING STANDARD PROBLEMS (COST 0.1) | #BEFORE REVIEW<br>for (···) {<br>  a = a + 1;<br>  b = b + 10;<br>}<br>--------------------<br>#AFTER REVIEW<br>  a +=10;<br>  b +=100; |

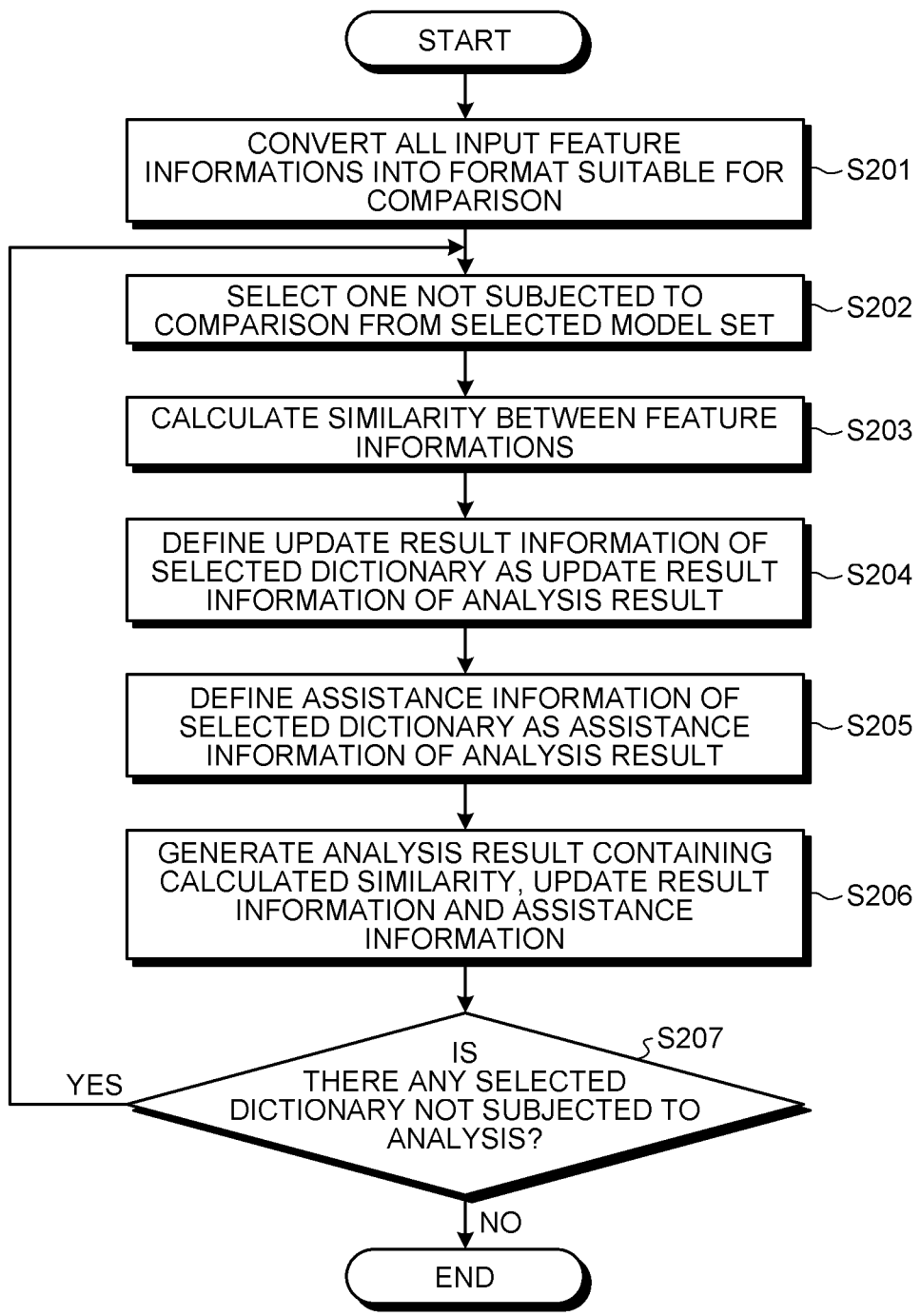

FIG.10

| word [0] | word [1] | word [2] | test | format | performance | comment |
|---|---|---|---|---|---|---|
| refactor | bug | test | 1 | 1 | 0.5 | 1 |

| word_refactor | word_bug | word_test | word_performance | test | format | performance | comment |
|---|---|---|---|---|---|---|---|
| 1 | 1 | 1 | 0 | 1 | 1 | 0 | 1 |

FIG.11

| word [0] | word [1] | word [2] | test | format | performance | comment |
|---|---|---|---|---|---|---|
| refactor | bug | test | 1 | 1 | 1.2 | 0 |

| word_refactor | word_bug | word_test | word_performance | test | format | performance | comment |
|---|---|---|---|---|---|---|---|
| 1 | 1 | 1 | 0 | 1 | 1 | 1 | 0 |

FIG.12

| word [0] | word [1] | word [2] | test | format | performance | comment |
|---|---|---|---|---|---|---|
| refactor | bug | test | 1 | 1 | 0.5 | 1 |

| UPDATE RESULT INFORMATION | READABILITY PROBLEMS (COST 0.1) | INSUFFICIENT TESTS (COST 1.0) | PERFORMANCE PROBLEMS (COST 0.1) | CODING STANDARD PROBLEMS (COST 0.1) |
|---|---|---|---|---|
| SIMILARITY | 80% | 70% | 60% | 90% |
| HISTORY INFORMATION | #BEFORE REVIEW<br>for (⋯) {<br>  a = a + 1;<br>  b = b + 10;<br>}<br>----------------------<br>#AFTER REVIEW<br>for (⋯) {<br>  a +=1;<br>  b +=10;<br>} | #BEFORE REVIEW<br>  a = a + 1;<br>  b = b + 10;<br><br>----------------------<br>#AFTER REVIEW<br>  a +=1;<br>  b +=10; | #BEFORE REVIEW<br>while (a<10) {<br>  a = a + 1;<br>  b = b + 10;<br>}<br>----------------------<br>#AFTER REVIEW<br>for (⋯) {<br>  a = a + 1;<br>  b = b + 10;<br>} | #BEFORE REVIEW<br>for (⋯) {<br>  a = a + 1;<br>  b = b + 10;<br>}<br>----------------------<br>#AFTER REVIEW<br>  a +=10;<br>  b +=100; |

INFORMATION PROCESSING APPARATUS AND METHOD, AND COMPUTER PROGRAM PRODUCT

CROSS-REFERENCE TO RELATED APPLICATION(S)

This application is based upon and claims the benefit of priority from Japanese Patent Application No. 2014-055360, filed on Mar. 18, 2014; the entire contents of which are incorporated herein by reference.

FIELD

An embodiment described herein relates to an information processing apparatus, an information processing method, and a computer program product.

BACKGROUND

There exists a technique of extracting a similar or identical portion in the source code to be analyzed. When a bug is found in a certain source code, this technique is used for finding a similar code to thereby increase maintenance working efficiency. This technique is a useful technique particularly when, for example, developing large scale software. It is easy to find a completely identical source code. However, in order to find a similar source code, flexibility is required with respect to differences in variables, function names, parameters and the like. For this reason, a similar code detection technique is used in which source code is standardized to thereby reduce dependence on a coding style.

However, in the related art, an identical or similar code can merely be found. For this reason, for example, information related to processing to be performed on the found code cannot be obtained. This sometimes inhibits maintenance work or code updating work from becoming sufficiently efficient.

BRIEF DESCRIPTION OF THE DRAWINGS

FIG. 8 is a diagram illustrating an example of a dictionary group used in an analysis process;
FIG. 9 is a flow chart of the analysis process;
FIG. 10 is a diagram illustrating an example of conversion of feature information into a vector;
FIG. 11 is a diagram illustrating an example of conversion of feature information into a vector;
FIG. 12 is a diagram illustrating an example of an analysis result.

DETAILED DESCRIPTION

According to an embodiment, an information processing apparatus includes a storage, an accepting unit, an analyzer, a determination unit, and an output controller. The storage stores therein one or more pieces of first feature information respectively representing features of one or more source codes, and one or more pieces of assistance information representing update situations of the source codes, in a corresponding manner. The accepting unit accepts input of second feature information representing a feature of a source code to be analyzed. The analyzer calculates similarity between the first feature information and the second feature information. The determination unit selects, based on the similarity, assistance information to be output, from the pieces of assistance information stored in the storage. The output controller outputs the selected assistance information.

An embodiment will be described in detail below with reference to accompanying drawings.

As described above, the related art is intended only to find a similar code in a source code, and is not concerned about classification attributes of the original source code. For this reason, information that a user can obtain is only the similar code, and information (assistance information) that assists with updating of the source code, such as information regarding an action to be taken by a user after the similar code is found cannot be obtained. Furthermore, since input is limited to a source code, there has been a problem that, for example, analysis using source code update logs or trace information cannot be performed.

In the present embodiment, with respect to a scope such as a source code or the like, assistance information to be used when a user checks the feature of the scope or updates the scope is previously stored. Then, the assistance information corresponding to a similar scope can be output. This enables: prediction and classification of a scope having a feature similar to original source code when a similar scope is found; display of information related to an action to be taken by a user from the feature information of the scope obtained through the classification; and display of the information and knowledge separately accumulated by developers and development teams.

Figure 1:
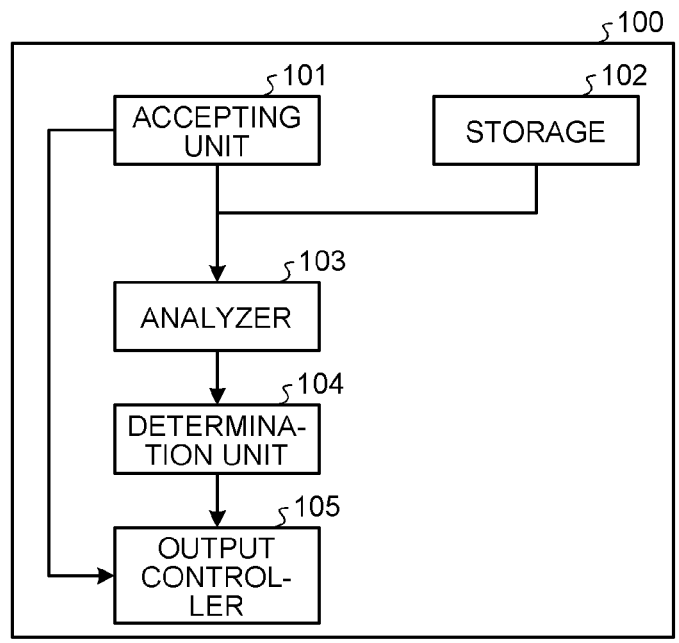
FIG. 1 is a functional block diagram of an information processing system according to an embodiment.

Hereinafter, the present embodiment will be described with reference to FIG. 1. FIG. 1 is a block diagram illustrating a function configuration of an information processing apparatus. An information processing apparatus 100 includes an accepting unit 101, a storage 102, an analyzer 103, a determination unit 104, and an output controller 105.

The storage 102 stores therein one or more pieces of feature information (one or more pieces of first feature information) respectively representing features of one or more source codes, and one or more pieces of assistance information representing update situations of the source codes, in a corresponding manner. As a data storing method in the storage 102, for example, the commonly used method of storing in a file system is used. Details of the feature information and the assistance information will be described later. The storage 102 can be constituted by any commonly used storage medium such as an HDD (Hard Disk Drive), an optical disk, a memory card, and a RAM (Random Access Memory).

The accepting unit 101 accepts input of various types of information. For example, the accepting unit 101 accepts input of feature information (second feature information) representing the feature of a scope to be analyzed (an analysis object scope). The scope is defined as the whole or a portion of the source code to be analyzed (an analysis object source code), and indicates a source code containing at least one source code in a program processing unit.

As an information input method by the accepting unit 101, for example, the commonly used method of inputting information from a file system is used. The information input method is not limited to this. For example, the method of inputting information read into a memory through a network may be used. As another method, for example, there is a method of interactively inputting information utilizing a GUI (Graphical User Interface).

The analyzer 103 calculates the similarity between the feature information (first feature information) stored in the storage 102, and the feature information (second feature information) of the analysis object scope. The analyzer 103 outputs an analysis result containing the calculated similarity, the stored assistance information, and the like. Details of an analysis process performed by the analyzer 103 will be described later.

The determination unit 104 determines, based on the calculated similarity, the assistance information to be output, from the pieces of assistance information stored in the storage 102. Details of determination process performed by the determination unit will be described later.

The output controller 105 controls outputting (displaying) the determined assistance information on a display device (not shown) such as a liquid crystal display. The output controller 105 utilizes, for example, a commonly used GUI (Graphical User Interface) to interactively output the assistance information. The output method is not limited to the method of displaying on a display device. For example, the output controller 105 may use the method of outputting the assistance information to another terminal or the like through a network, the method of outputting the assistance information into a file system, and the method of outputting by printing the assistance information using a printer or the like.

The accepting unit 101, the analyzer 103, the determination unit 104, and the output controller 105 may be implemented by: causing a processing device such as a CPU (Central Processing Unit) to execute a program, that is, by software; hardware such as an IC (Integrated Circuit); or a combination of software and hardware.

Figure 2:
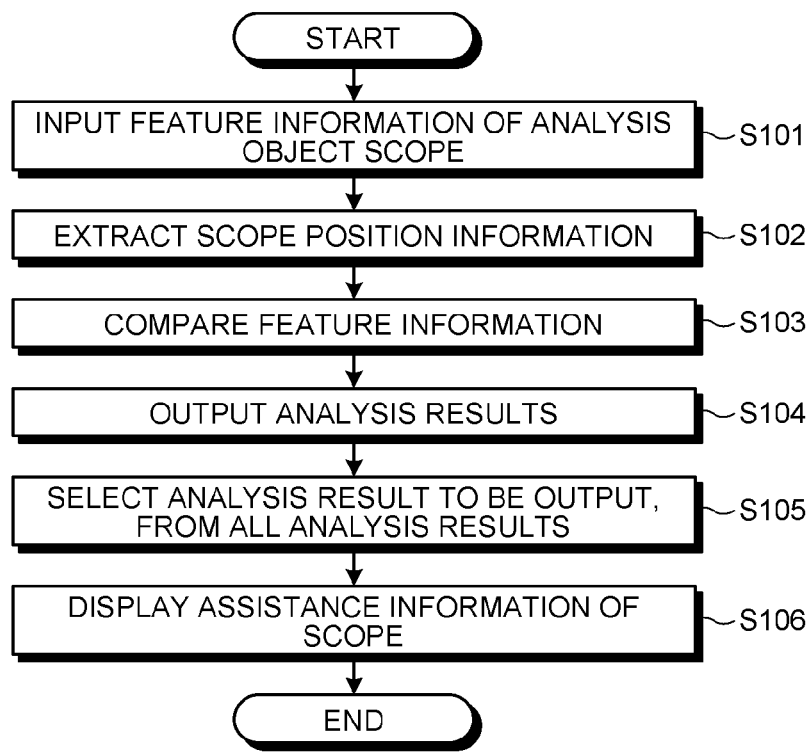
FIG. 2 is a flow chart of an output process of an information processing apparatus in an embodiment.

Next, the general outline of an output process performed by the information processing apparatus 100 according to the present embodiment constituted in this manner will be described using FIG. 2. FIG. 2 is a flow chart illustrating an example of the output process according to the present embodiment.

The accepting unit 101 accepts input of feature information (second feature information) of an analysis object scope (step S101). The accepting unit 101 extracts scope position information from the accepted feature information (step S102). The scope position information is defined as information (specification information) that specifies the analysis object scope. The scope position information is, for example, information that specifies the position of a scope in a source code. Details of the scope position information will be described later.

The analyzer 103 compares the feature information of the analysis object scope with the pieces of feature information stored in the storage 102 (step S103). As will be described later, the analyzer 103 may convert the accepted feature information into a format for comparing to the stored pieces of feature information, and may compare the converted feature information with the stored pieces of feature information. The analyzer 103 outputs the analysis results containing the similarity calculated in the comparison, the stored assistance information, and the like (step S104).

The determination unit 104 determines whether to select one or more analysis results or to select no analysis result, from one or more analysis results obtained in the analyzer 103, using an evaluation condition (evaluation formula) with at least one of the similarity and the assistance information (step S105). Next, the output controller 105 displays the assistance information for updating the scope, with the scope position information extracted from the feature information of the analysis object scope, and the selected analysis result (hereinafter, referred to as a determination result) (step S106).

Figure 3:
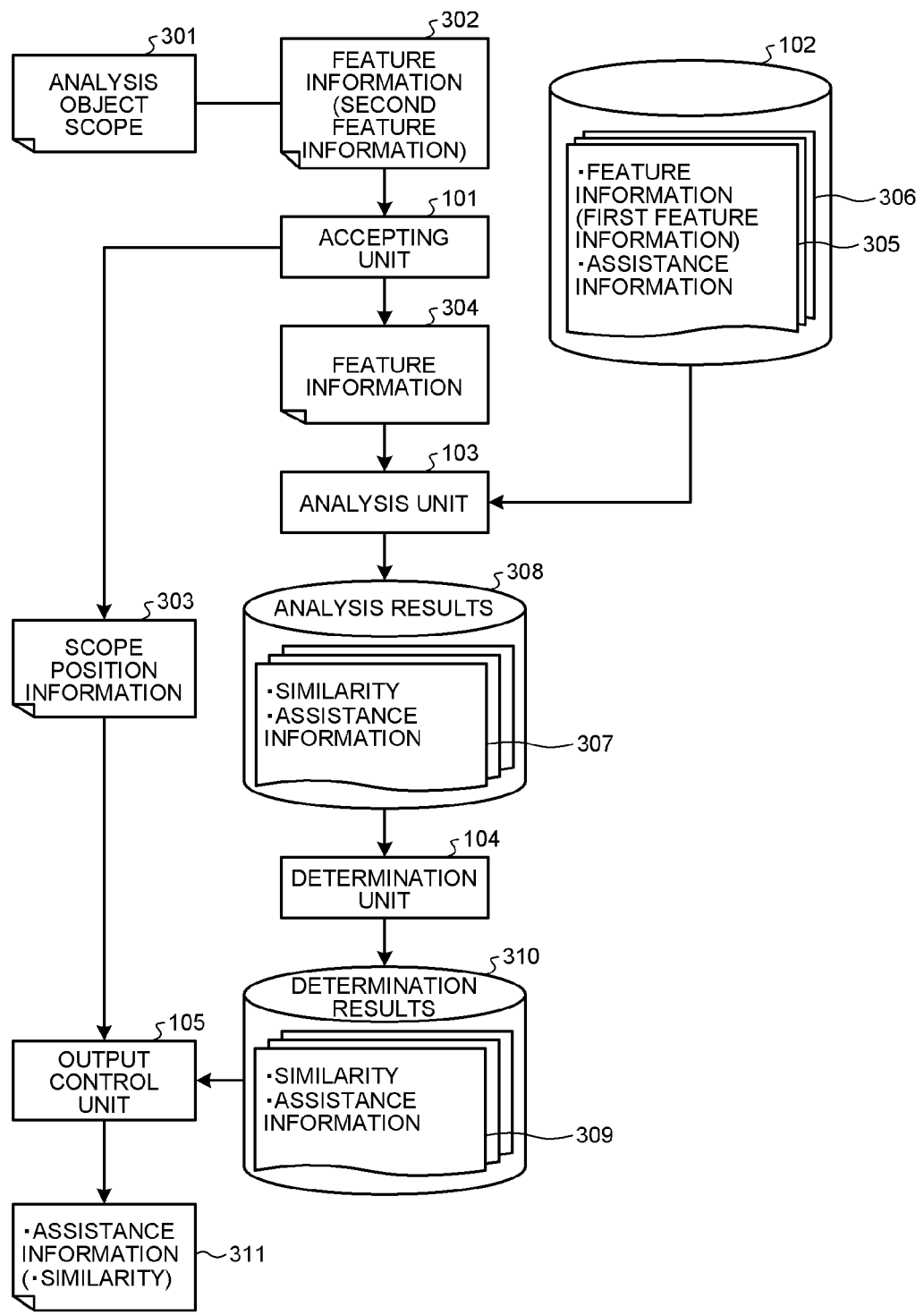
FIG. 3 is a diagram illustrating details of the output process.

Below, using FIG. 3, details of output process performed by the information processing apparatus 100 will be further described. The process illustrated in FIG. 3 is an example, and the output process is not limited to this.

An analysis object scope 301 contains a processing unit suitable for analysis, such as a block unit. Feature information 302 is information containing the information representing the feature of the analysis object scope 301. More specifically, the feature information 302 is information containing at least one piece of the information representing the feature of the source code itself and the execution history information (trace information) of the source code. For example, the feature information 302 is information such as a trace result of the source code associated with the analysis object scope. The accepting unit 101 inputs the feature information 302 associated with the analysis object scope 301.

The accepting unit 101 extracts feature information 304 (third feature information) to be compared with the feature information stored in the storage 102, from the feature information 302. When the feature information 302 has a format allowing comparison with the feature information stored in the storage 102, the extraction of the feature information 304 may not be executed. In this case, the feature information 302 is used to be compared with the feature information stored in the storage 102.

Figure 4:
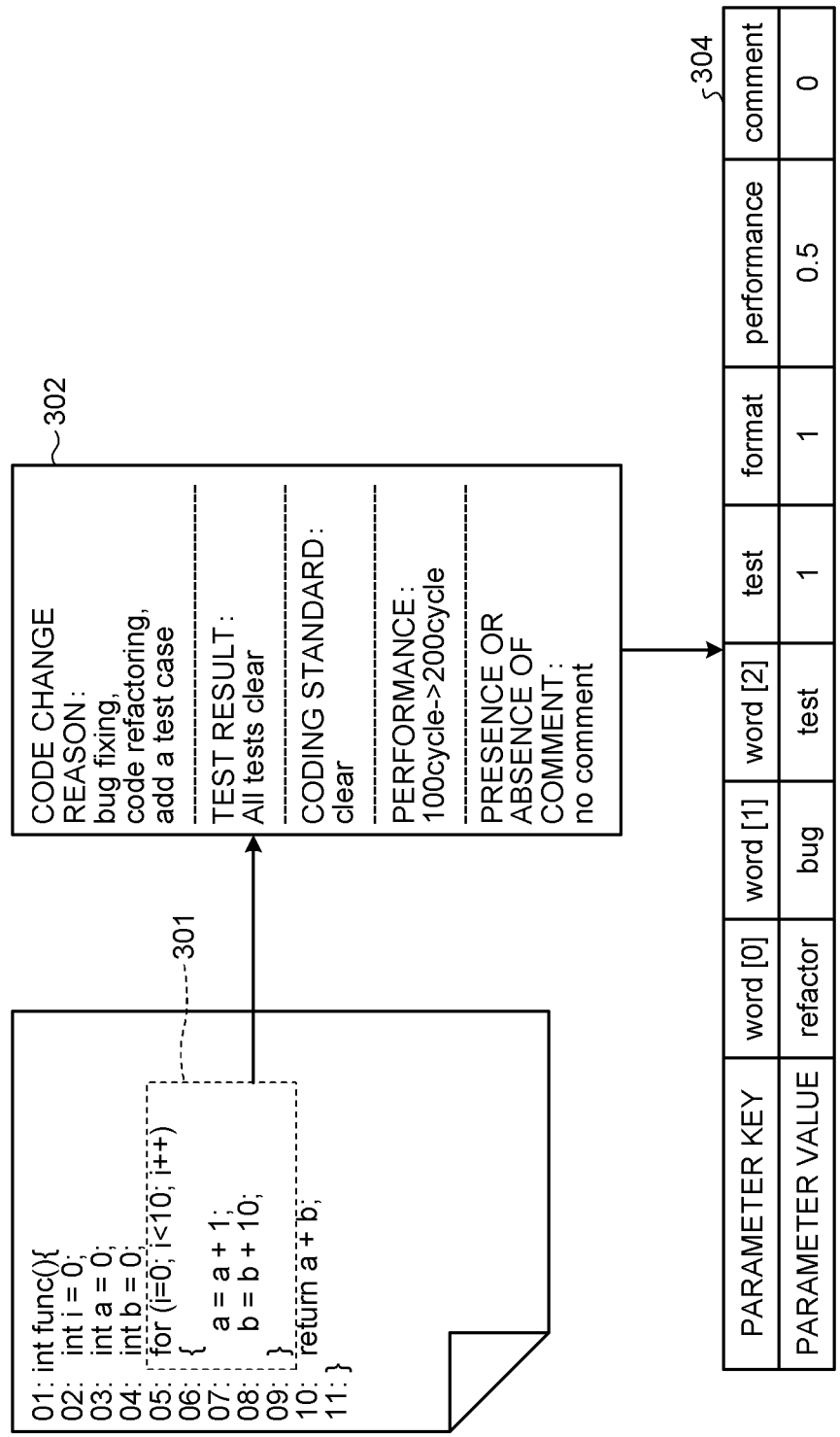
FIG. 4 is a diagram illustrating an example of an analysis object scope, feature information and feature information.

The feature information 304 is expressed as a combination of parameter values such as a character string, an integer and a real number, based on the information extracted from the feature information 302. FIG. 4 is a diagram illustrating an example of the analysis object scope 301, the feature information 302, and the feature information 304. The analysis object scope 301 is, for example, a location of a source code that has been changed, or a location of a source code that is to be changed.

In the example of FIG. 4, the feature information 302 contains information of "code change reason", "test result", "coding standard", "performance", and "presence or absence of comment" to be used for, for example, evaluation and classification in code reviews.

The feature information 304 contains parameter keys that are items representing the features of a scope, and parameter values representing the values of the parameter keys. For example, the feature information 304 contains, as parameter keys, word [0], word [1], word [2], test, format, performance, and comment. These parameter keys are only examples, and are not intended to suggest any limitation.

Word [n] (n=0, 1, . . . ) is a parameter key that sets a word contained in the feature information 302. Test is a parameter key that sets whether or not tests have been cleared. Format is a parameter key that sets whether or not coding standard is satisfied. Performance is a parameter key that sets a degree to which performance has been improved. Comment is a parameter key that sets presence or absence of a comment.

In the example of FIG. 4, the words used in "code change reason" of the feature information 302 are indicated by the parameter values of "refactor", "bug" and "test" corresponding to the parameter keys word [0], word [1] and word [2].

The number of words is not limited to three, and may be any number. For example, all the words (alternatively, all the nouns or the like) contained in the feature information 302 may be extracted, and set to parameter keys word [0], word [1], . . . of the feature information 304. A word that is identical to or similar to a previously determined registered word may be extracted.

"Test result" of the feature information 302 indicates that all of the conditions such as performance and functions designated by a user are satisfied in all tests. Therefore, parameter value "1" indicating that tests satisfy conditions is set to the parameter key test. When tests do not satisfy conditions, for example, parameter value "0" is set. The parameter value may be expressed not only by two values, but also by a ratio of tests satisfying the conditions designated by a user to all tests, such as parameter value "0.6".

"Coding standard" of the feature information 302 indicates that the analysis object scope 301 satisfies coding standard. Therefore, parameter value "1" indicating that coding standard is satisfied is set to the parameter key "format". When coding standard is not satisfied, for example, parameter value "0" is set. The parameter value is expressed not only by two values, but also by a ratio of tests satisfying the conditions designated by a user to all tests, such as parameter value "0.6".

"Performance" of the feature information 302 indicates that the performance has been changed from 100 cycles to 200 cycles due to, for example, the change of the analysis object scope 301. Since the performance has become 0.5 times, real number "0.5" is set as a parameter value to the parameter key "performance".

"Presence or absence of comment" of the feature information 302 indicates that a comment is not written. Therefore, parameter value "0" indicating that there is not a comment is set to the parameter key "comment". When there is a comment, for example, parameter value "1" is set.

In this manner, the feature information 304 usually comes to be a set of a plurality of parameter keys. Each parameter key has one parameter value.

Figure 5:
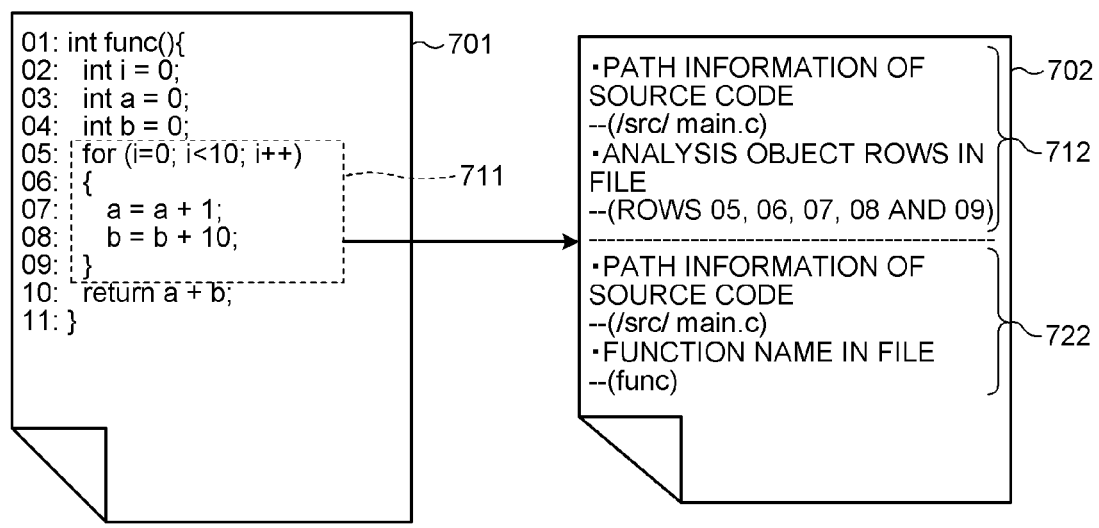
FIG. 5 is a diagram explaining examples of scope position information.

Returning to FIG. 3, the accepting unit 101 further outputs scope position information 303 of the analysis object scope 301. The scope position information 303 is information that specifies a scope to be analyzed. FIG. 5 is a diagram for explaining an example of the scope position information. Scope position information 702 of FIG. 5 is two examples of the scope position information of an analysis object scope 711 contained in analysis object source code 701.

As illustrated in FIG. 5, in scope position information 712, a combination of path information of a source code and analysis object rows in a file, for example, is used as the scope position information. When the analysis object source code is a file or a function, a combination of path information of a source code, and a file name or a function name, like scope position information 722, may be used as the scope position information. The scope position information is not limited to these, and may be any information that can specify the analysis object scope.

Returning to FIG. 3, the storage 102 stores therein pieces of feature information and pieces of assistance information in a corresponding manner. A dictionary 305 of FIG. 3 indicates information in which a piece of feature information and a piece of assistance information are corresponded to each other. The storage 102 stores therein a dictionary group 306 that is a collection of such dictionaries. Each dictionary 305 contains, for example, feature information having parameter keys common with the feature information 304. Furthermore, assistance information contained in each dictionary 305 includes, for example, history information and update result information.

The history information is information indicating an update history of the source code associated with the feature information contained in the dictionary 305. For example, the history information is information in which the source code before updating and the source code after updating are corresponded to each other.

The update result information contains, for example, attribute information and difference information. The attribute information is information representing the purpose of updating source code. Examples of the attribute information to be set can include readability problems, insufficient tests, performance problems, and coding standard problems. The difference information is information indicating cost (implementation cost), change in performance (performance improvement ratio), and the like caused by change. Such update result information is an example, and is not intended to suggest any limitation. For example, only one piece of the attribute information and the difference information may be used as the update result information.

Figure 6:
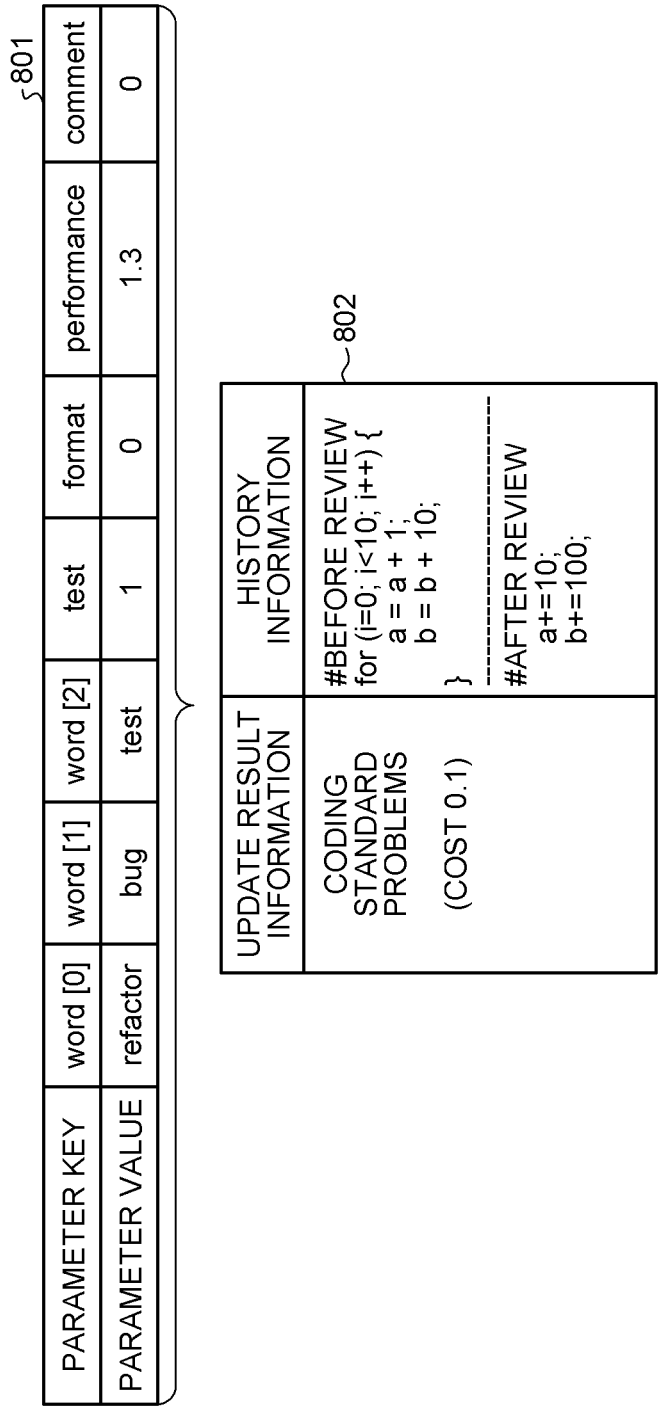
FIG. 6 is a diagram illustrating an example of a data structure of a dictionary.

FIG. 6 is a diagram illustrating an example of the data structure of the dictionary 305. As illustrated in FIG. 6, parameter keys of feature information 801 contained in the dictionary 305 are constituted by parameter keys similar to those of the feature information 304 of FIG. 4. Parameter values in the feature information 801 are different from those of the feature information 304 of FIG. 4. In the example of FIG. 6, assistance information 802 corresponding to the feature information 801 contains the update result information in which the attribute information is "coding standard problems", and the difference information is "cost 0.1". Furthermore, the assistance information 802 contains the history information expressed by analysis object source codes before and after updating. The source code below "before review" is information before updating of the analysis object source code, and the source code below "after review" is information after updating of the analysis object source code.

Figure 7:
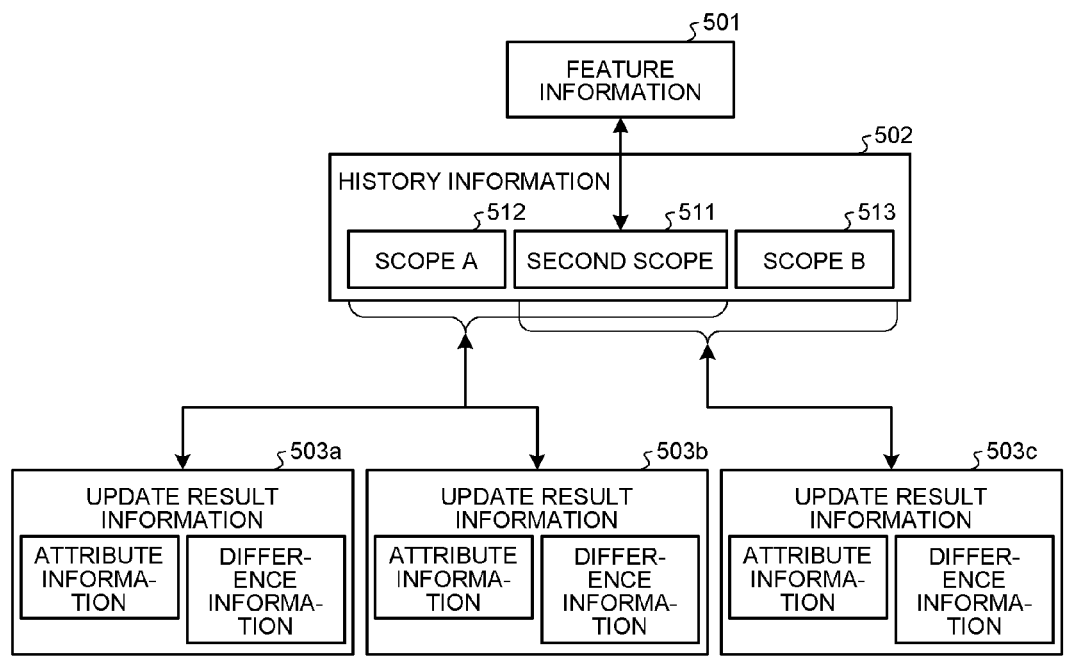
FIG. 7 is a diagram illustrating the relationship among update result information, history information and feature information.

Next, the relationship among the update result information, the history information and the feature information contained in the dictionary 305 will be described using FIG. 7. FIG. 7 is a diagram illustrating the relationship among the update result information, the history information and the feature information contained in the dictionary.

Feature information 501 to be stored in the dictionary is generated from feature information 511 of a second scope.

History information 502 is generated based on the feature information 511 and pieces of feature information 512 and 513 of other scopes (scopes A and B). Pieces of update result information 503a to 503c are generated based on the feature information 511, and the pieces of feature information 512 and 513 of the other scopes. The number of pieces of update result information to be generated is not limited to one, and may be two or more. For example, in FIG. 7, a plurality of pieces of update result information 503a and 503b is generated from the feature information 511 of the second scope and the feature information 512 of the scope A. For example, the scope A and the scope B are set to be the scopes before and after the updating of the second scope. It is noted that the scope A and the scope B are not necessarily limited to scopes before and after updating, but may be other scopes having a difference from the second scope. Furthermore, the update result information can be associated with one or more pieces of attribute information and difference information.

Returning to FIG. 3, the analyzer 103 inputs the dictionary group 306 stored in the storage 102, and generates an analysis result 307 containing similarity between the feature information 304 and the feature information contained in the dictionary 305, the history information contained in the dictionary 305, and the update result information contained in the dictionary 305. One or more analysis results 307 are output. Therefore, the output one or more analysis results 307 are defined as an analysis result group 308.

Using FIG. 8 to FIG. 11, an analysis process performed by the analyzer 103 will be described. FIG. 8 is a diagram illustrating an example of the dictionary group 306 used in an analysis process. FIG. 9 is a flow chart illustrating an example of the analysis process. A dictionary and feature information to be input are assumed to be constituted by parameter keys identical to the feature information 801 explained in FIG. 6. Furthermore, the attribute information includes four types of readability problems, insufficient tests, performance problems, and coding standard problems. Even when the number of parameter keys of the feature information increases, similar behaviors are taken.

The analyzer 103 initially inputs all of the dictionaries 305 output from the dictionary group 306 and the feature information 304. The analyzer 103 converts the feature information 304 and the feature information contained in the dictionaries 305 into a format suitable for comparison (step S201).

FIG. 10 and FIG. 11 are diagrams illustrating examples of converting the feature information into a vector. FIG. 10 and FIG. 11 illustrate examples of converting a parameter key word [ ] into a parameter key that expresses whether or not a word appeared by two values (for example, "1" when a word appeared, "0" when a word did not appear). Parameter keys word_refactor, word_bug, word_test and word_performance express whether or not words "refactor", "bug", "test" and "performance" appeared respectively.

The parameter values ("0" and "1") of parameter keys "test", "format", "comment" and the like can be adopted as they are. With respect to the parameter key "performance", a parameter value exceeding 1.0 may be converted into 1, and a parameter value within 1.0 may be defined to be 0.

The execution of format conversion enables the feature information to be treated as a vector. This can, for example, reduce the load of a comparison process of the feature information. However, there are some cases where the analyzer 103 does not need to convert the feature information, such as when the feature information is expressed in a format that allows comparison.

Next, the analyzer 103 selects one dictionary 305 that is not used for the analysis with the feature information 304 (step S202). The analyzer 103 calculates similarity between the feature information contained in the selected dictionary 305 and the feature information 304 (step S203). The similarity is an index representing a degree to which the feature information contained in the dictionary 305 and the feature information 304 are similar to each other. The similarity is calculated using parameter keys (common parameter keys) commonly contained in each piece of feature information.

For example, the similarity is calculated using cosine similarity between the vector of the feature information 304 and the vector of the feature information contained in the dictionary 305 both having been generated by format conversion (step S201). Based on an assumption that the vectors are x and y, cosine similarity is calculated according to formula (1) below. In the formula (1), |x| is a norm of x; and |y| is a norm of y.

$$\cos(x,y) = xy^T / |x||y| \tag{1}$$

For example, the cosine similarity between the vector indicated in FIG. 10 and the vector indicated in FIG. 11 becomes approximately 80% as indicated in formula (2) below.

$$\cos(x,y) = 5/6 \approx 0.8 \tag{2}$$

The calculation method of similarity is not limited to the above-described example, and may be any calculation method as long as it is an algorithm causing the similarity between the pieces of feature information to be calculated. For example, the similarity between the pieces of feature information may be a sum (or a weighted added value) of the similarities each having been compared for each parameter key contained in the piece of feature information. When each parameter value is a character string, the similarity to be used may include the ratio of coinciding characters, the edit distance between character strings, and the like.

Next, the analyzer 103 defines the update result information contained in the selected dictionary as the update result information to be output as the analysis result (step S204). Furthermore, the analyzer 103 defines the assistance information contained in the selected dictionary as the assistance information to be output as the analysis result (step S205). The analyzer 103 generates a combination of the similarity, the history information and the update result information generated in step S203 to step S205, as the analysis result (the analysis result 307 in FIG. 3) (step S206). The analyzer 103 judges whether or not there is a dictionary that is selected in step S202 and has not been subjected to analysis with the feature information 304 (step S207). When there is a dictionary that has not been subjected to the analysis (step S207: Yes), the analyzer 103 returns to step S202 to repeat the process. When there is not a dictionary that has not been subjected to the analysis (step S207: No), the analyzer 103 ends the analysis process.

A specific example of the analysis result will be described using FIG. 12. FIG. 12 is a diagram illustrating examples of the analysis result. The combination of parameter values written in the upper part of FIG. 12 is the feature information 304 that has become an input of the analyzer 103. The combination of parameter values in the lower part of FIG. 12 is a result of comparison between the feature information 304 and each piece of feature information contained in the selected dictionary group 306. FIG. 12 illustrates four analysis results corresponding to the dictionary group in FIG. 8. One analysis result includes the update result information, the similarity and the history information in this order in one column. In the example of FIG. 12, the feature information 304 has similarity to a certain dictionary having the attribute of readability problems of 80%; and the history information held by this dictionary is illustrated as the history information of the analysis result. Similar information is illustrated with respect to other three dictionaries. Although all pieces of the update result information are different from each other in the example, there is a case where the pieces of attribute information in the update result information are similar to each other while the similarity, the difference information in the update result information, and the history information are different. This is because analysis is performed for each individual dictionary.

As a method of inputting information from the storage 102 to the analyzer 103, for example, the commonly used method of inputting information from a file system is used. Alternatively, the method of inputting information already read into a memory through a network may be used. As another method, for example, there is the method of interactively inputting information utilizing a GUI (Graphical User Interface).

Figure 13:
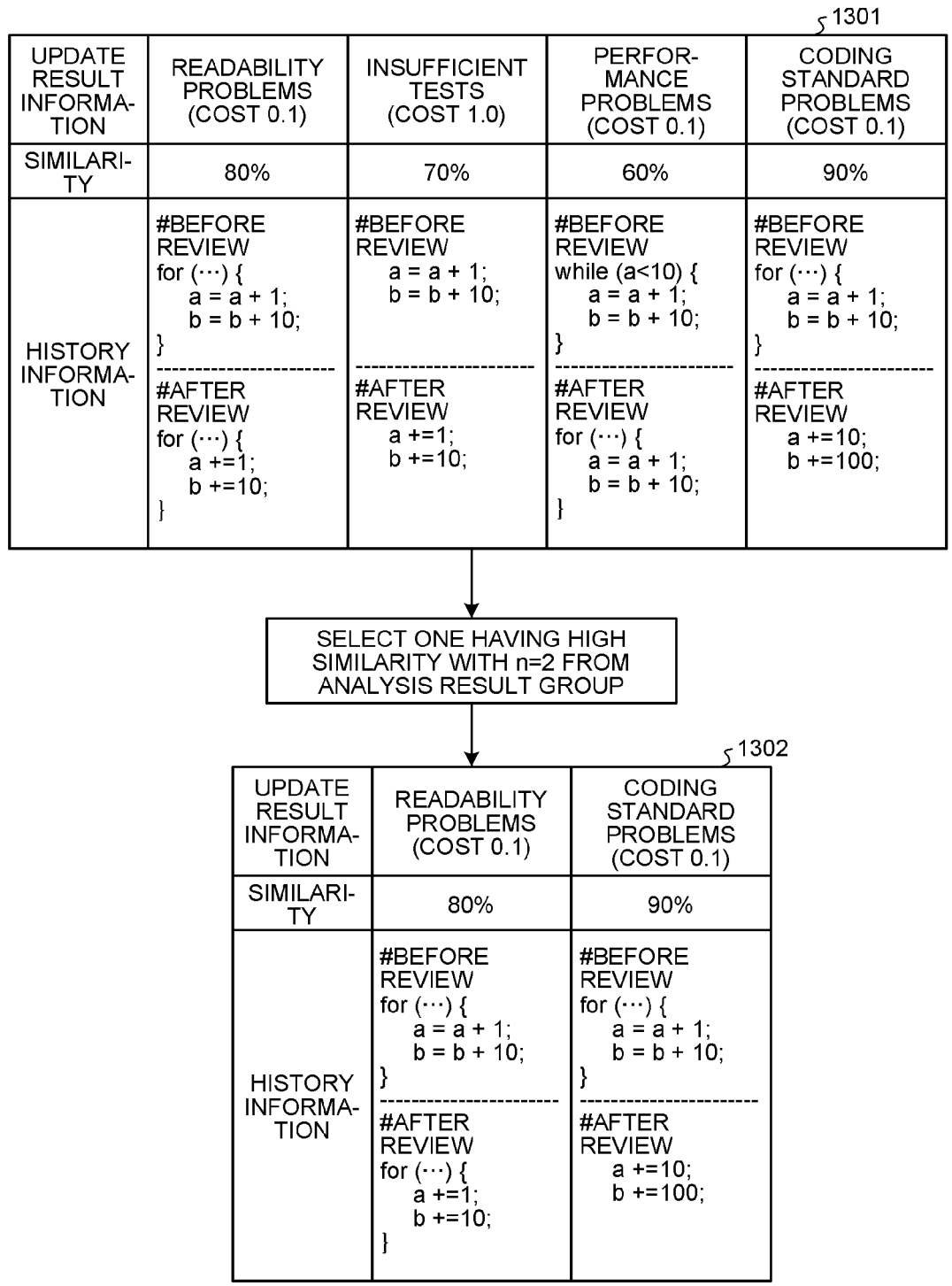
FIG. 13 is a diagram of a determination pattern when determining a determination result group from an analysis result group.

Returning to FIG. 3, the determination unit 104 determines whether to select one or more determination results 309 or not to select the determination result, from the analysis result group 308 output from the analyzer 103, according to the evaluation condition using the similarity. For example, the condition of determining n analysis results in descending order of similarity can be used as an evaluation condition. The whole of the determination results is defined as a determination result group 310. A fundamental determination pattern in which the determination unit 104 determines the determination result group 310 from the analysis result group 308 will be described using FIG. 13. The determination pattern of FIG. 13 is the pattern of selecting n analysis results having high similarity from an analysis result group 1301. In the example of FIG. 13, the determination unit 104 selects two analysis results (n=2) having high similarity. As a result, two analysis results having similarities of 90% and 80% are determined as the determination result (a determination result group 1302).

The determination method (determination pattern) performed by the determination unit 104 is not limited to this. For example, any evaluation condition can be used as an evaluation condition, as long as it employs at least one of the similarity, the attribute information contained in the update result information, and the difference information contained in the update result information. For example, the evaluation condition of selecting n or less analysis results that have a similarity of equal to or more than a predetermined threshold value (or less than a threshold value) may be used. Alternatively, for example, the evaluation condition of selecting n or less analysis results that have a performance improvement rate as the difference information of equal to or more than a predetermined threshold value (or less than a threshold value) may be used.

Returning to FIG. 3, the output controller 105 outputs assistance information 311 of the analysis object scope 301 from a group of 0 or more determination results. The output controller 105 outputs the source code specified by the scope position information 303 and the assistance information in a corresponding manner. The assistance information may be one or both of the update result information and the history information. In addition to the assistance information, similarity may be output.

Figure 14:
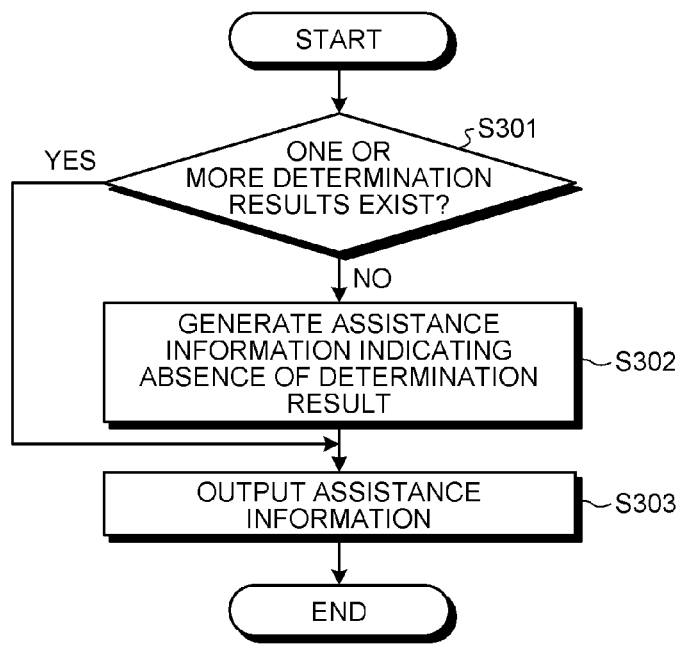
FIG. 14 is a flow chart of an output control process performed by an output controller.

FIG. 14 is a flow chart illustrating an example of an output control process performed by the output controller 105. The determination results 309 contained in the determination result group 310 have the condition of being 0 or more. For this reason, the steps until display step vary between when the number of determination results 309 is 0 and when it is one or more. That is, the output controller 105 determines whether or not one or more determination results exist (step S301). When the determination result does not exist, that is, when the number of determination results is 0 (step S301: No), the output controller 105 generates pseudo assistance information (step S302). For example, the output controller 105 generates assistance information indicating that a determination result does not exist.

Figure 15:
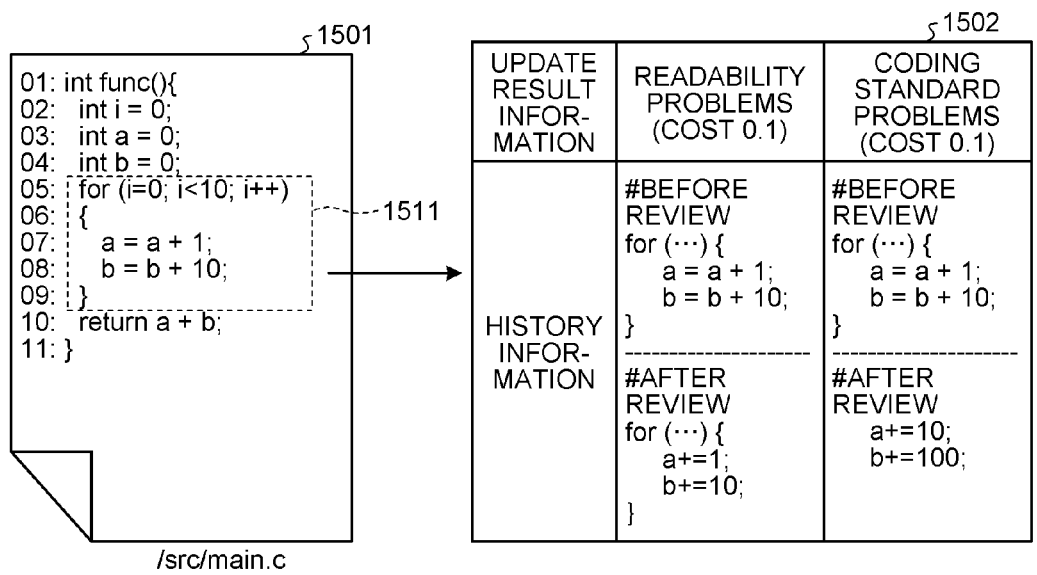
FIG. 15 is a diagram illustrating a specific example of a display method of assistance information.

When the number of determination results is one or more (step S301: Yes), the output controller 105 displays the scope position information 303 and the assistance information of the determination result contained in the determination result group (step S303). FIG. 15 is a diagram illustrating a specific example of a display method of the assistance information. FIG. 15 is an example of displaying the update result information and the history information of two determination results having similarity being high to the analysis object scope. In the example of FIG. 15, the path name of a file of analysis object source code 1501 and the function of the source code are illustrated. The loop in the function is surrounded with dotted lines as an analysis object scope 1511.

The output method for specifying the analysis object scope is not limited to the example of FIG. 15, and may be any method as long as the position of the analysis object scope can be specified. For example, the position may be indicated by the path name of a file of analysis object source code and the lines of code within the analysis object source code. The output controller 105 outputs the analysis object scope 1511 specified by the scope position information and assistance information 1502 in a corresponding manner, so that the update result information and the history information related to the analysis object scope become apparent.

Next, modifications of the analysis object scope, the comparison method in the analyzer 103, the selection pattern in the determination unit 104, and the output method in the output controller 105 will be described. It is noted that a structure including a combination of each of the modifications, for example, can also be implemented.

Figure 16:
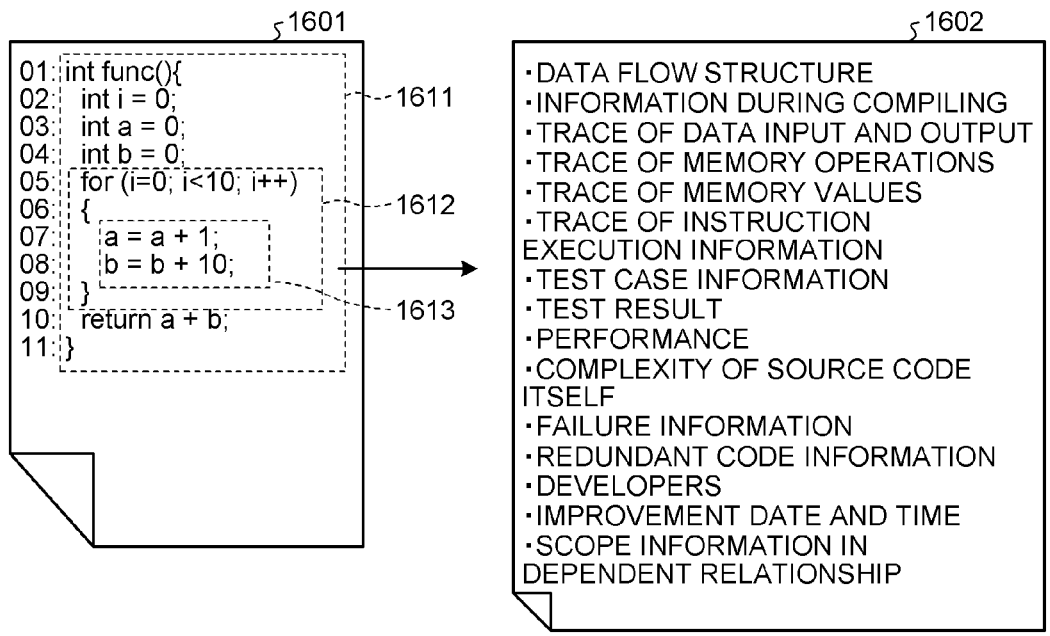
FIG. 16 is a diagram illustrating examples of a scope.

Examples of the program processing unit in the analysis object scope may include a file unit, a block unit such as a function and a method, a loop processing unit, and a basic block unit not containing a branch therein. FIG. 16 is a diagram illustrating an example of a function block unit scope 1611, a loop processing unit scope 1612, and a basic block unit scope 1613. The smallest block illustrated is the basic block.

The program processing unit is not limited to the examples of FIG. 16, and may be in any division format as long as it is a portion of the source code that can be divided in a specific processing unit. The analysis object scope may be source code or a comment described in a programming language such as the C language and the Java (registered trademark) language or a program language particular to a specific processing device.

Feature information 1602 associated with an analysis object source code 1601 containing the above-described processing units is constituted by one or more pieces of information related to an analysis object scope. Examples of such information include, as illustrated in FIG. 16, data flow structure, information during compiling, trace of data input and output, trace of memory operations, trace of memory values, trace of instruction execution information, test case information, test result, performance, complexity of source code itself, failure information, redundant code information, developers, update date and time, and scope information in dependent relationship. A portion or the whole of the analysis object source code 1601 may be contained in the feature information.

The feature information is not limited to the above, and may include any feature information as long as it contains an element related to the analysis object scope. Furthermore, the number of analysis object scopes may not be necessarily one. For example, when the analysis object source code is larger than an assumed program processing unit, the source code can be divided for each processing unit to generate a plurality of analysis object scopes.

Figure 17:
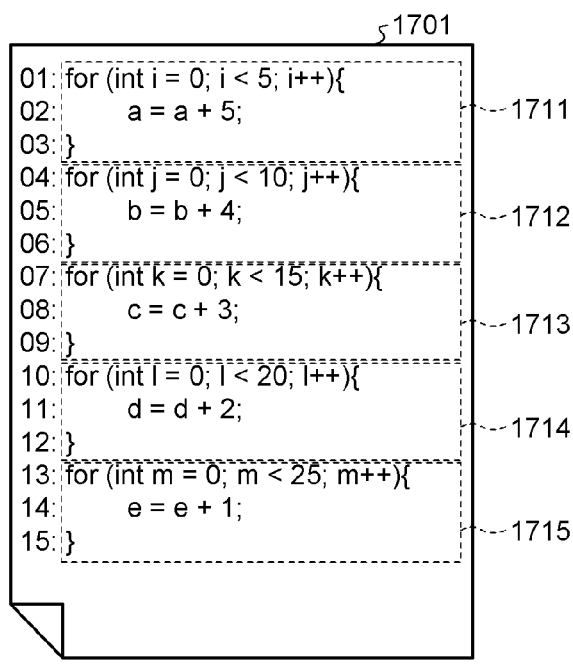
FIG. 17 is a diagram illustrating the relationship between analysis object source code and an analysis object scope.
Figure 18:
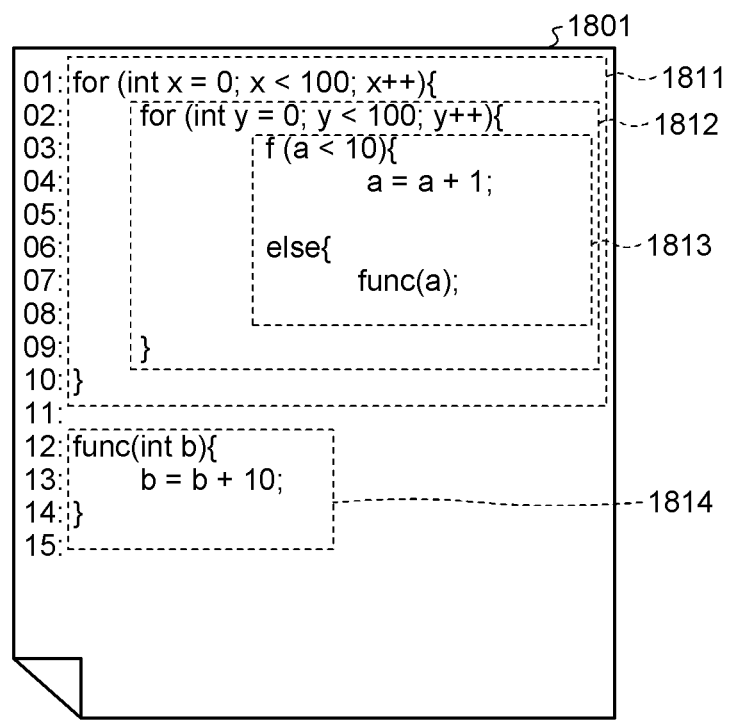
FIG. 18 is a diagram illustrating the relationship between analysis object source code and an analysis object scope.

FIG. 17 and FIG. 18 are diagrams illustrating examples of the relationship between the analysis object source code and the analysis object scope. In FIG. 17, five analysis object scopes 1711 to 1715 each being in a loop processing unit are extracted from one analysis object source code 1701.

When the analysis object source code has a nest structure including a conditional statement, a loop statement, a structure and a function call, a descendant scope can also be treated as an analysis object scope. In FIG. 18, when the first loop statement in analysis object source code 1801 is defined as an analysis object scope 1811, another loop statement is contained inside the analysis object scope 1811. Therefore, the inside loop statement is defined as an analysis object scope 1812. Since a conditional branch is contained inside the analysis object scope 1812, the conditional branch scope is defined as an analysis object scope 1813. Since a function func is contained inside the analysis object scope 1813, the function func is defined as an analysis object scope 1814. The analysis object scope is not limited to the above-described examples. A scope having any relationship can be plurally input.

Next, the generation method of the dictionary group in the storage 102 will be described. While the analyzer 103 inputs all dictionaries stored in the storage 102, the pieces of feature information used in the dictionaries need to have parameter keys common to those of the feature information 304. For this reason, a dictionary that does not have the common parameter keys cannot be input to the analyzer 103. Of the dictionaries stored in the storage 102, a dictionary having attribute information that is not defined as an analysis object by a user cannot be input to the analyzer 103. Therefore, when the dictionary not to be input to the analyzer 103 is contained in the storage 102, only the dictionaries to be input to the analyzer 103 may be extracted and used as the dictionary group 306. For example, the analyzer 103 may select dictionaries excluding the dictionaries that contain attribute information being outside the analysis object or difference information being outside the range required by a user, to execute the analysis process. The generation method of the dictionary group is not limited to the above-described case. The dictionary may be selected from the storage 102 using any information, as long as the information is held by the update result information of the dictionary.

Next, format conversion of the feature information in the analyzer 103 will be described. In the above-mentioned embodiment, each element of the vector after the format of the feature information has been converted is expressed by 0 or 1. However, each element can also be expressed by a real number.

Next, the selection pattern of the determination results from the analysis result group in the determination unit 104 will be indicated. The first pattern is, as already illustrated in FIG. 13, the method of selecting n analysis results having high similarity from the analysis result group. Other than the above, the determination results can be selected using the evaluation condition to an optional combination of the similarity, the attribute information in the update result information, and the difference information.

Finally, the output method in the output controller 105 will be explained. The first display method is a basic display example illustrated in FIG. 15, and has already been explained. The output method is not limited to the example of FIG. 15, and may be any output method as long as it outputs the assistance information (the history information and the update result information) and the analysis object scope in a corresponding manner.

As described above, in the present embodiment, the assistance information for changing a specific location of source code in software development can be output using an example of code reviews. The effects can be expected not only in code reviews, but also when updating source code for various purposes, such as when changing source code for improving performance. Examples of other effects according to the present embodiment will be indicated below.

The present embodiment provides effects in sharing empirical knowledge in software development. In software development, source code, trace information, update log information, and the like in the past are often discarded without being stored. In this case, past resources cannot be used in subsequent software development. Even when source code, trace information, update log information, and the like are stored, assistance information useful for the feature information corresponding to analysis object source code cannot be indicated, when the dictionary containing the feature information, the history information, the update result information, and the like does not exist.

According to the present embodiment, dictionaries based on the pieces of feature information of past source code can be stored in the storage 102. Therefore, empirical knowledge can be stored. Furthermore, since the pieces of assistance information are contained in the dictionaries, information necessary for understanding source code or changing source code can be easily extracted, even if the number of dictionaries contained in the storage 102 becomes enormous. This enables maintenance work and code change work to become more efficient.

The present embodiment also provides effects in weight reduction of data. In order to store past empirical knowledge in software development, the method of storing source code, trace information, update log information, and the like is conceivable. However, when all pieces of the information are stored, the data amount becomes enormous, thereby causing a time taken for extraction of empirical knowledge to also become enormous. This is not realistic.

According to the present embodiment, information such as source code, trace information and update log information can be converted into a format of the feature information, and stored. This enables only necessary data to be stored, thereby achieving data weight reduction. This applies to not only the pieces of feature information to be input, but also the pieces of feature information contained in the dictionaries stored in the storage 102.

The present embodiment also provides effects in maintaining confidentiality of source code and personal information. When all of source code, update log information and trace information in the past are stored in the storage 102, the source code and the personal information that require confidentiality to be maintained can be viewed while the storage 102 can be accessed. Thus, confidentiality cannot be maintained.

In the present embodiment, the whole of information such as source code may not be stored. Instead, the feature information and the assistance information that contain only necessary information may be stored. That is, the information involving confidentiality can be excluded from the feature information and the assistance information. This enables the confidentiality of source code and personal information to be maintained even when the storage 102 is illegally accessed.

The present embodiment also provides effects on easiness in viewing information. When all of the analysis results are output, information becomes enormous, possibly inhibiting a user from understanding the display. However, according to the present embodiment, the determination unit 104 can perform the limitation of limiting information to be displayed to only information necessary for a user. This allows easy viewing of displayed information to be achieved.

Figure 19:
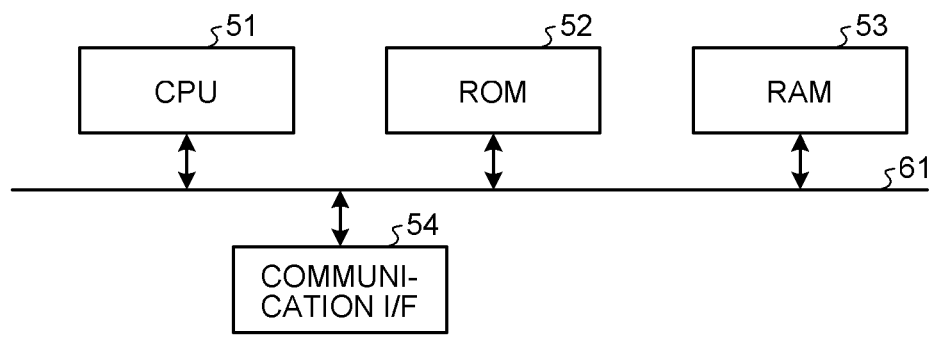
FIG. 19 is a hardware configuration diagram of an information processing apparatus according to the present embodiment.

Next, a hardware configuration of the information processing apparatus according to the present embodiment will be described using FIG. 19. FIG. 19 is a schematic diagram illustrating a hardware configuration of the information processing apparatus according to the present embodiment.

The information processing apparatus according to the present embodiment includes a control device such as a CPU (Central Processing Unit) 51, a storage device such as an ROM (Read Only Memory) 52 and a RAM (Random Access Memory) 53, a communication I/F 54 that is connected to a network and performs communication, and a bus 61 that connects the units with each other.

A program to be executed in the information processing apparatus according to the present embodiment is provided by being previously incorporated into the ROM 52 or the like.

The program to be executed in the information processing apparatus according to the present embodiment may be configured so as to be provided as a computer program product by being stored in a computer-readable recording medium such as a CD-ROM (Compact Disk Read Only Memory), a flexible disk (FD), a CD-R (Compact Disk Recordable) and a DVD (Digital Versatile Disk), in a file of an installable format or an executable format.

Furthermore, the program to be executed in the information processing apparatus according to the present embodiment may be configured so as to be provided by being stored on a computer connected to a network such as the Internet and being downloaded via a network. Also, the program to be executed in the information processing apparatus according to the embodiment may be configured so as to be provided or distributed via a network such as the Internet.

The program to be executed in the information processing apparatus according to the present embodiment can cause a computer to function as the units of the above-described information processing apparatus. In this computer, the CPU 51 can read a program from a computer-readable recording medium on a main storage device, and execute the read program.

While a certain embodiment have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing apparatus, comprising:
    a storage to store therein one or more pieces of first feature information respectively representing features of one or more source codes, and one or more pieces of assistance information representing update situations of the source codes, in a corresponding manner;
    an accepting unit to accept input of second feature information representing a feature of a scope included in a source code to be analyzed, and extract position information specifying a position of the scope from the second feature information;
    an analyzer to calculate similarity between the first feature information and the second feature information;
    a determination unit to select, based on the similarity, assistance information to be output, from the pieces of assistance information stored in the storage; and
    an output controller to output the scope specified by the position information and the selected assistance information in a corresponding manner.

2. The apparatus according to claim 1, wherein
    the assistance information contains an update history of the source code, a purpose of a source code update, or a change in cost or performance of the source code resulting from an update.

3. The apparatus according to claim 1, wherein
    the output controller further outputs the similarity between the first feature information corresponding to the selected assistance information and the second feature information.

4. The apparatus according to claim 1, wherein
    the accepting unit extracts third feature information, to be compared with the first feature information, from the second feature information, and
    the analyzer calculates the similarity between the third feature information and the first feature information.

5. A computer program product comprising a non-transitory computer-readable medium containing a computer program for causing a computer to:
    store one or more pieces of first feature information respectively representing features of one or more source codes, and one or more pieces of assistance information representing update situations of the source codes in a corresponding manner;
    accept input of second feature information representing a feature of a scope included in a source code to be analyzed;
    extract position information specifying a position of the scope from the second feature information;
    calculate similarity between the first feature information and the second feature information;
    select, based on the similarity, assistance information to be output from amongst the stored pieces of assistance information; and
    output the scope specified by the position information and the selected assistance information in a corresponding manner.

6. The computer program product according to claim 5, wherein the assistance information contains an update history of the source code, a purpose of a source code update, or a change in cost or performance of the source code resulting from an update.

7. The computer program product according to claim 5, further causing the computer to:

output the similarity between the first feature information corresponding to the selected assistance information and the second feature information.

8. The computer program product according to claim 5, further causing the computer to:

extract third feature information, to be compared with the first feature information, from the second feature information; and calculate the similarity between the third feature information and the first feature information.

9. An information processing method to be executed in an information processing apparatus, comprising:

storing one or more pieces of first feature information respectively representing features of one or more source codes, and one or more pieces of assistance information representing update situations of the source codes in a corresponding manner;

accepting input of second feature information representing a feature of a scope included in a source code to be analyzed;

extracting position information specifying a position of the scope from the second feature information;

calculating similarity between the first feature information and the second feature information;

selecting, based on the similarity, assistance information to be output, from the pieces of assistance information stored in the storage; and outputting the scope specified by the position information and selected assistance information in a corresponding manner.

10. The method according to claim 9, wherein
the assistance information contains an update history of the source code, a purpose of a source code update, or a change in cost or performance of the source code resulting from an update.

11. The method according to claim 9, further comprising:
outputting the similarity between the first feature information corresponding to the selected assistance information and the second feature information.

12. The method according to claim 9, further comprising:
extracting third feature information, to be compared with the first feature information, from the second feature information; and calculating the similarity between the third feature information and the first feature information.

13. The apparatus according to claim 4, wherein
the first feature information and the third feature information respectively include a parameter key that is item representing a feature of the scope and a parameter value representing a value of the parameter keys.

14. The computer program product according to claim 8, wherein
the first feature information and the third feature information respectively include a parameter key that is item representing a feature of the scope and a parameter value representing a value of the parameter keys.

15. The method according to claim 12, wherein
the first feature information and the third feature information respectively include a parameter key that is item representing a feature of the scope and a parameter value representing a value of the parameter keys.

* * * * *